(12) United States Patent
Sumanaweera et al.

(10) Patent No.: US 7,037,263 B2
(45) Date of Patent: May 2, 2006

(54) COMPUTING SPATIAL DERIVATIVES FOR MEDICAL DIAGNOSTIC IMAGING METHODS AND SYSTEMS

(75) Inventors: Thilaka Sumanaweera, Los Altos, CA (US); Robert N. Phelps, Sammamish, WA (US); John C. Lazenby, Fall City, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 10/644,363

(22) Filed: Aug. 20, 2003

(65) Prior Publication Data

US 2005/0043619 A1 Feb. 24, 2005

(51) Int. Cl.
*A61B 8/00* (2006.01)

(52) U.S. Cl. ...................................... 600/443; 128/916
(58) Field of Classification Search ................. 600/443, 600/447, 453–456; 128/916; 382/128, 285; 345/419, 426, 501
See application file for complete search history.

(56) References Cited

U.S. PATENT DOCUMENTS 5,268,877 A * 12/1993 Odell .......................... 367/103
5,283,837 A * 2/1994 Wood .......................... 382/285

(Continued)

*Primary Examiner*—Francis J. Jaworski

(57) ABSTRACT

Spatial derivatives are computed. In one method, gradients are determined from data in an acoustic domain rather than a Cartesian or display coordinate domain. The gradients determined from data in the acoustic domain are then transformed to the Cartesian coordinate or display screen domain. For example, a matrix function representing the spatial relationship between the acoustic domain and the Cartesian coordinate domain transforms the coordinates. As a result, spatial gradients in the Cartesian system are provided where acoustic domain data is being processed. In another method for volume rendering or three-dimensional imaging, a gradient is calculated from data in the display or screen domain. Data from a reconstructed 3D Cartesian coordinate grid or data in an acoustic domain is resampled to ray lines. The ray lines correspond to the display domain as compared to an arbitrary Cartesian coordinate format. The gradients are calculated from the resampled data in the screen domain. When resampling on data in an acoustic domain, gradient computation prior to the resampling may require transformation as discussed above. To avoid the transformation, the gradients are determined after resampling. By calculating the gradients after resampling, interpolation of gradient information as part of the resampling is avoided or minimized. The gradient calculation is then performed using data in the display coordinate space (i.e., screen domain) without requiring further random memory accesses. In yet another method, the number of computation and interpolations for gradient calculation is reduced by performing shading prior to resampling along ray lines to the screen domain. The gradients are calculated and the voxel data in the acoustic or 3D grid Cartesian coordinate formats are altered or weighted as a function of the shading. The shaded data is then resampled to the ray lines. For example, the shading values are computed from data in an acoustic domain and applied to the data in the acoustic domain. The data is then ray cast or interpolated to ray lines without prior scan conversion.

27 Claims, 3 Drawing Sheets

U.S. PATENT DOCUMENTS

| | | | | |
|---|---|---|---|---|
| 5,299,576 A | * | 4/1994 | Shiba | 600/443 |
| 5,412,563 A | * | 5/1995 | Cline et al. | 345/420 |
| 5,544,283 A | * | 8/1996 | Kaufman et al. | 345/424 |
| 5,615,679 A | * | 4/1997 | Ri et al. | 600/437 |
| 5,689,577 A | * | 11/1997 | Arata | 382/128 |
| 5,720,291 A | * | 2/1998 | Schwartz | 600/456 |
| 5,855,557 A | * | 1/1999 | Lazenby | 600/443 |
| 6,064,391 A | * | 5/2000 | Sano et al. | 345/424 |
| 6,110,114 A | | 8/2000 | Nock et al. | |
| 6,130,671 A | * | 10/2000 | Argiro | 345/424 |
| 6,179,780 B1 | | 1/2001 | Hossack et al. | |
| 6,234,968 B1 | | 5/2001 | Sumanaweera et al. | |
| 6,306,091 B1 | | 10/2001 | Sumanaweera et al. | |
| 6,366,800 B1 | * | 4/2002 | Vining et al. | 600/425 |
| 6,429,861 B1 | | 8/2002 | Hossack et al. | |
| 6,537,221 B1 | * | 3/2003 | Criton et al. | 600/454 |
| 6,676,599 B1 | * | 1/2004 | Torp et al. | 600/437 |
| 6,776,759 B1 | * | 8/2004 | Heimdal et al. | 600/442 |
| 6,852,081 B1 | | 2/2005 | Sumanaweera et al. | |
| 2004/0034304 A1 | * | 2/2004 | Sumi | 600/439 |

* cited by examiner

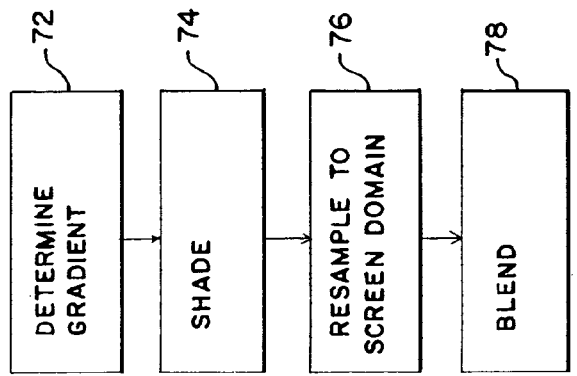
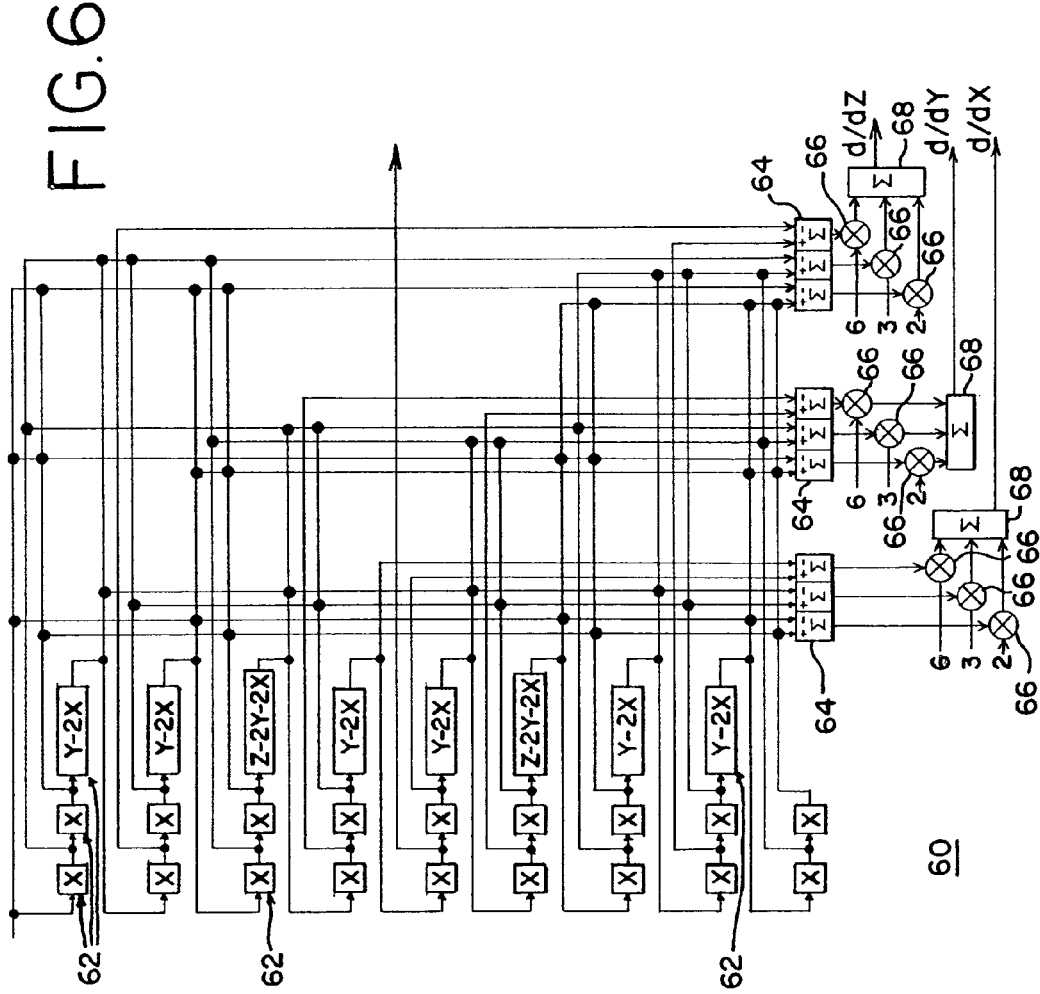

COMPUTING SPATIAL DERIVATIVES FOR MEDICAL DIAGNOSTIC IMAGING METHODS AND SYSTEMS

BACKGROUND

The present invention relates to medical imaging using gradient information. In particular, methods and systems for medical diagnostic imaging with computed spatial derivatives are provided. The computed spatial derivatives are used for volume rendering three dimensional images with shading or for other two- or three-dimensional imaging and image processing purposes.

Spatial gradients or derivatives are used in ultrasound imaging for various two- or three-dimensional applications. For example, filtering or motion tracking uses gradient information for two-dimensional ultrasound imaging. The gradients are calculated from scan converted data. Scan converted data is in a regular Cartesian grid for use by a display. Spatial derivatives of scan converted data are easily computed using filters. However, scan converted data may not be available for all applications using gradients, such as where the gradient information is used for processing data in an acoustic domain, such as in a spherical coordinate format associated with scanning. Since the resolution of ultrasound images is angle dependent and depth dependent, processing of scan converted ultrasound data may not be optimal as compared to processing of data in an acoustic domain. Changing the filtering parameters as a function of depth and scan line angle may be expensive or difficult to implement.

Gradients are used for shading representations of a volume. Volume rendering is a technique for visualizing 3D or 4D ultrasonic data on a computer screen. The viewer is assumed to view the data from an arbitrary vantage point. The computer screen is assumed to be between the viewer and the ultrasound data, with the computer screen being orthogonal to the viewing direction. Hypothetical rays are then cast from each pixel on the screen into the data volume. Data is re-sampled at regular intervals along the ray. The weighted sum of all data samples on each ray, after mapping using a suitable transfer function, is painted at each pixel of the screen, generating a volume rendered image of the 3D or 4D volume.

Volume rendering can be made more realistic by using shading. Shading assumes there are one or more light sources in the scene and each data sample on the ray has an associated gradient direction given by a unit vector. In the simplest lighting model, a Lambertian reflectance model is assumed, where the contribution by the light source is A cos θ, where A is the intensity of the light source and θ is the angle between the direction of the light source and the normal direction at the data sample. The contribution from the light source is combined into the weighted sum described above at each data sample along the ray during volume rendering, resulting in a more realistic-looking image. More complex lighting models also exist, such as Phong Specular Reflection Model, where the contribution from the light source takes the form A cos θ cos ″α, where α is the angle between the direction of the viewer and the normal direction at the data sample and n is an integer. Note that the contributions from the light sources do not need to be recomputed when the viewing direction changes in the Lambertian model, in contrast to the Phone Specular Reflection model, where the contributions from the light sources are recomputed.

There are five basic steps to the process of volume rendering:
1. Segmentation
2. Gradient Computation
3. Re-sampling
4. Classification
5. Shading In the step of Segmentation, the data values in the volume are labeled. For example, the data values can be labeled as belonging to moving tissue, stationary tissue, blood, bone, different tissue types, B-mode, Doppler, etc. Segmentation basically subdivides the volume into regions of some homogeneous property. The regions can also overlap and may use probabilistic models. For example, a given data sample may contain 50% blood, 20% tissue and 30% bone.

In the step of Gradient Computation, spatial gradients along three orthogonal directions are computed at each data sample. A unit vector is then generated by normalizing the spatial gradient vector for each data sample. In the step of Re-sampling, rays are cast from the pixels on the screen as described above and data and/or the normal vectors are re-sampled. In the step of Classification, the data values and/or the segmented data values are mapped using transfer functions and opacity functions. In the step of Shading, the contribution from the light sources are combined with the classified data values.

For three-dimensional (3D) imaging, volume rendering with shading uses gradients to modulate the voxel data using a hypothetical light coming from one or more light sources. To perform real time three-dimensional volume rendering with shading, spatial gradients along three dimensions are computed in real time. The three-dimensional gradients are calculated using finite impulse response filters convolved with the ultrasound data and indicate the strength and direction of spatial boundaries. The amount of light from a directional light source reflected to the viewer is determined as a function of these boundaries.

For 3D imaging, ultrasound or other medical imaging data is reconstructed or formatted onto a three-dimensional grid. For example, the three-dimensional grid represents a Cartesian coordinate format in three dimensions. The gradients for each location within the 3D grid are determined along three dimensions. The voxels of the 3D grid and associated gradients along three different dimensions are then resampled (i.e. interpolated) along the ray lines. Since three different gradient values are interpolated for each voxel, effectively four volumes are interpolated to the ray lines. However, interpolation of the gradients is expensive both in terms of computation and data access. When the three-dimensional data set is repetitively updated in real time, such as associated with four-dimensional ultrasound imaging, the directional gradient may be recomputed each time the data set changes. Additionally, each time the viewing direction changes, the gradients may be resampled.

BRIEF SUMMARY

The present invention is defined by the following claims, and nothing in this section should be taken as a limitation on those claims. By way of introduction, the preferred embodiments described below include methods and systems for computing spatial derivatives in medical imaging. In one embodiment, gradients are determined from data in an acoustic domain rather than a Cartesian or display coordinate domain. The gradients determined from data in the acoustic domain are then transformed to the Cartesian coordinate or display screen domain. For example, a matrix function representing the spatial relationship between the acoustic domain and the Cartesian coordinate domain transforms the coordinates. As a result, spatial gradients in the Cartesian format are provided where acoustic domain data is being processed. U.S Pat. No. 6,852,081 (application Ser. No. 10/388,128), the disclosure of which is incorporated herein by reference, discloses real time volume rendering from data in an acoustic grid. As a result of such volume rendering, scan converted data is unavailable. Any transformed gradients allow shading from data free of scan conversion.

In another embodiment for volume rendering or three-dimensional imaging, a gradient is calculated from data in the display or screen domain. Data from a reconstructed 3D Cartesian coordinate grid or data in an acoustic domain is resampled to ray lines. The ray lines correspond to the display domain as compared to an arbitrary Cartesian coordinate format. The gradients are calculated from the resampled data in the screen domain. When resampling on data in an acoustic domain, gradient computation prior to the resampling may require transformation as discussed above. To avoid the transformation, the gradients are determined after resampling. By calculating the gradients after resampling, interpolation of gradient information as part of the resampling is avoided or minimized. The resampling is performed either before or after segmentation so that the resampling provides voxel information at the display coordinates without interpolation of gradient information. The gradient calculation is then performed using data in the display coordinate space (i.e., screen domain) without requiring further random memory accesses. For example, a pipe line delay or buffer system may be used.

In yet another embodiment, the number of computation and interpolations for gradient calculation is reduced by performing shading prior to resampling along ray lines to the screen domain. The gradients are calculated and the voxel data in the acoustic or 3D grid Cartesian coordinate formats are altered or weighted as a function of the shading. The shaded data is then resampled to the ray lines. For example, the shading values are computed from data in an acoustic domain and combined with the data in the acoustic domain. The data is then ray cast or interpolated to ray lines without prior scan conversion.

In a first aspect, a method for computing spatial derivatives for medical imaging is provided. A spatial gradient vector is determined in an acoustic domain for at least one ultrasound data sample. The spatial gradient vector is transformed to a Cartesian coordinate system.

In a second aspect, an improvement in a method for computing spatial derivatives for medical ultrasound imaging is provided. A spatial gradient vector representing a gradient in a Cartesian coordinate space is calculated from ultrasound data in the acoustic domain. The ultrasound data in the acoustic domain is free of scan conversion.

In a third aspect, a system for computing spatial derivatives from medical ultrasound imaging is provided. A receive beamformer is operable to output ultrasound data in an acoustic domain. A graphics processing unit connects with the receive beamformer. The graphics processor unit is operable to determine a spatial gradient vector in the acoustic domain from the ultrasound data and operable to transform the spatial gradient vector to a Cartesian coordinate system.

In a fourth aspect, a method for computing spatial derivatives for medical ultrasound imaging is provided. Ultrasound data in an acoustic domain is resampled to ray lines representing a viewing angle through a volume. Gradient information is determined from the resampled ultrasound data.

In a fifth aspect, a method for computing spatial derivatives for medical ultrasound imaging is provided. Ultrasound data representing a three-dimensional volume is shaded. The shaded ultrasound data is resampled to ray lines representing a viewing angle through a volume.

Further aspects and advantages of the invention are described below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 6 is a block diagram of one embodiment for calculating gradients using delays; and FIG. 7 is a block diagram of one embodiment for determining gradients and shading prior to resampling to the screen domain.

DETAILED DESCRIPTION OF THE DRAWINGS AND PRESENTLY PREFERRED EMBODIMENTS

Figure 1:
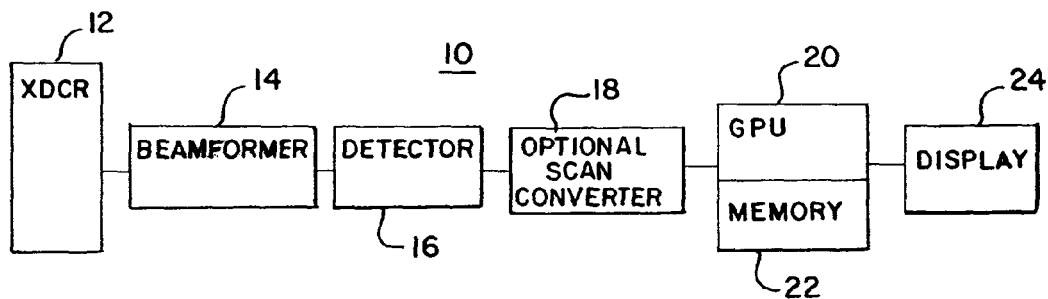
FIG. 1 is a block diagram of one embodiment of an ultrasound system for computing spatial derivatives.

Various embodiments are provided for shading data for volume rendering and/or determining gradients. In one embodiment, gradients are computed in the acoustic domain and transformed into gradients in a Cartesian coordinate system. This step only changes the gradient values. The locations of the gradient samples are not altered. The new gradient values are still in the acoustic sample locations. The transformed gradients are used for either two or three dimensional imaging. In another embodiment, the gradients are computed from data resampled to ray-lines or the screen domain for volume rendering. In yet another embodiment, the data is shaded using gradient information prior to resampling to ray-lines or the screen domain for volume rendering. FIG. 1 provides a system for implementing one, two or all of these different embodiments. The different embodiments are then discussed separately.

FIG. 1 shows an ultrasound system 10 for computing spatial derivatives for medical imaging, such as computing gradients for volume rendering ultrasound data for 3D imaging. In other embodiments, the system 10 provides 2D imaging with enhanced filtering or processes based on gradient information. The ultrasound system 10 includes a transducer 12, a beamformer 14, a detector 16, an optional scan converter 18, a GPU 20 with a memory 22, and a display 24. Additional, different or fewer components may be provided, such as providing a control processor for configuring the system 10 and providing scan position information to or from the beamformer 14 to the GPU 20 or memory 22 and/or providing another processor for 2D or 3D imaging.

The transducer 12 comprises a 1, 1.25, 1.5, 1.75, or two-dimensional array of elements. The array of elements is configured as linear, curvilinear, sector, Vector®, or other imaging configurations. In one embodiment, the transducer 12 is configured to allow electrical steering on the transmit- and receive-beams in two dimensions, such as steering along an azimuthal axis and an elevation axis. For example, one or two rows of elements are configured for steering in the azimuthal direction electronically in response to delays and apodization and in the elevation direction in response to frequency, such as disclosed in U.S. Pat. Nos. 6,043,589; 5,678,554; and 6,057,632, the disclosures of which are incorporated herein by reference. Variations in the thickness of the transducer along the range dimension as a function of elevation allow for frequency based steering in elevation. As another example, a one-dimensional or multi-dimensional array is mechanically wobbled or steered in the elevation dimension, such as disclosed in U.S. Pat. Nos. 4,151,834 and 4,399,822, the disclosures of which are incorporated herein by reference. In other embodiments, the transducer 12 comprises a multi-dimensional array for steering in the elevation and azimuthal dimensions in response to relative delays and apodization. Alternatively, the transducer 12 comprises a linear array or multi-dimensional array for electronically steering in the azimuthal dimension and for orienting in the elevation dimension in response to user movement of the transducer 12. As yet another alternative, a transducer that is rotatable around a range axis allows scanning a volume. Other transducers now known or later developed for steering in an elevation and azimuthal dimensions may be used, such as a one-dimensional array used for two-dimensional imaging.

The beamformer 14 comprises a transmit and a receive beamformer, such as waveform generators, waveform memories, delays, amplifiers, counters, transistors, switches, filters, summers, or other devices for transmitting and receiving along scan lines. The beamformer 14 controls delays, apodization, frequency or other electrical characteristic and/or controls a mechanical positioning or sensing of the position of the transducer 12 for electrically and/or mechanically focusing the array of elements of the transducer 12 along one or more scan lines. The beamformer 14 connects with the transducer 12 for generating acoustic beams along an acoustic grid corresponding to the scan lines. The data output by the beamformer 14 is in an acoustic domain (i.e., the acquisition domain). For example, a polar coordinate format is used in a two-dimensional plane or a spherical format is used in a three-dimensional volume to acquire signals representing range samples along scan lines within the plane or volume. The scan lines are at an angle to the transducer 12 in the azimuth dimension and a same or different angle in the elevation dimension.

The acoustic data is collected by rocking, rotating, or sliding the transducer 12 with mechanical movement or using electronic beam steering. In a spherical coordinate format acoustic grid, the scan lines are at a same or different angles in one or both of the azimuth and elevation dimensions, emanate from a same or different points along the face of the transducer dimensions) and are sampled along a range dimension. All scan lines may meet at a single point called an apex. In alternative embodiments, a cylindrical grid or other coordinate system is used. The scan lines are parallel, such as associated with linear imaging or diverging, such as associated with sector or Vector® scanning. The acoustic grid comprises a sample pattern defined by the various scan lines and sampling along the scan lines. The sampling of acoustic information is in a Cartesian grid, polar grid, hexagon grid, cylindrical grid or other grid system. Where the sampling is along a Cartesian grid, such as using a linear array, the sampling is likely with a different resolution than the display Cartesian grid. As a result, scan conversion is typically performed on such data, but may be minimized or eliminated using the processes described herein.

The detector 16 comprises a B-mode, Doppler, flow or other detector for identifying intensity, energy, velocity or other information from the beamformed signals.

The optional scan converter 18 comprises a processor, application specific integrated circuit, digital circuitry, multiplexer, latches, shifters, digital circuitry, analog circuitry or combinations thereof for converting from the acoustic grid to a Cartesian coordinate grid, such as associated with a display. Where the three-dimensional representation is rendered or other processes performed from data free of formatting along a Cartesian coordinate grid, the scan converter 18 is skipped, not provided, or turned off. In embodiments where some data is formatted in a Cartesian coordinate system, the scan converter 18 converts some data from the acoustic grid to the Cartesian coordinate grid.

The memory 22 comprises a video random access memory, a random access memory, a removable media (e.g. diskette, compact disc or digital video disc) or other memory device for storing data or video information. In one embodiment, the memory 22 comprises a video random access memory of a graphics processing unit or accelerator card. In alternative embodiments, the memory 22 is separate from the graphics processing unit 20, such as a cache memory of a processor, the system memory or other memory. The memory 22 is operable to store ultrasound data formatted in an acoustic grid or at least in part an acoustic grid, such as data in both a Cartesian coordinate grid and acoustic grid.

The graphics processing unit, GPU 20, comprises one or more of a graphics accelerator chip, general processor, applications specific integrated circuit, circuit, card or combinations thereof. In one embodiment, the GPU 20 comprises a personal computer graphics accelerator card or components, such as manufactured by nVidia (e.g. FX3000 or others), ATI (e.g., Radien 9800 or others), or Matrox (Parhelia or others). The GPU 20 provides hardware devices (e.g. a programmable vertex processor, a primitive assembly processor, a rasterization and interpolation processor, a programmable fragment processor and a frame buffer) for accelerating volume rendering, imaging or other processes, such as using application programming interfaces (API) for three-dimensional volume rendering with shading or for image enhancement of two-dimensional images using gradient information. Example APIs include OpenGL and DirectX, but other APIs may be used independent of or with the GPU 20. The GPU 20 connects with the receive beamformer, such as directly connecting to the receive beamformer or connecting through one or more other components (e.g., detector 16).

In alternative embodiments, the GPU 20 is used for calculating gradients used for two-dimensional imaging with scan conversion after the GPU 20. The GPU 20 or another processor or filter enhances the two-dimensional imaging as a function of the gradient information. For example, the GPU 20 outputs gradients to a processor that performs adaptive filtering to enhance contrast while reducing speckle using gradient information.

The GPU 20 is operable to determining a spatial gradient vector in the acoustic domain from the ultrasound data and operable to transform the spatial gradient vector to a Cartesian coordinate system. Alternatively or additionally, the GPU 20 is operable to resample ultrasound data to ray-lines or a display screen domain prior to determining gradients and shading the ultrasound data for volume rendering. In another alternative or additional embodiment, the GPU 20 is operable to shade ultrasound data prior to resampling to ray-lines and then compositing the shaded, resampled data.

The GPU 20 is operable to volume render the ultrasound data, such as volume rendering from ultrasound data free of conversion to a Cartesian coordinate format. The GPU 20 is operable to texture map with alpha blending or other volume rendering of the ultrasound data based on a spatial relationship of an intersection of a plane or a curved surface perpendicular to the viewing direction with an acoustic grid or data space.

The GPU 20 and/or the memory 22 are included within the system as part of a single ultrasound system component, such as an ultrasound system on a cart in a same housing. In alternative embodiments, the GPU 20 and memory 22 are provided separate from an ultrasound data acquisition system, such as provided in a workstation or personal computer. The ultrasound data at least in part in the acoustic grid is transferred wirelessly, over a computer network or through a transferable storage medium to the GPU 20.

The display 24 comprises a CRT, LCD, flat panel, plasma screen, video projector or other device for displaying a two-dimensional representation of a three-dimensional volume. For example, the display 24 comprises a color display capable of 512×512 of pixels area, but greater or lesser resolutions may be provided. Monochrome displays are used in alternative embodiments.

Using a user interface of the system 10 in conjunction with the GPU 20 and the display 24, the user views renderings of the ultrasound data from various viewing angles to perceive a three-dimensional view from the two-dimensional display. Each representation is associated with a different viewing angle. Using a same set of acoustic data or a continuing stream of acoustic data, multiple two-dimensional representations of the three-dimensional volume are provided.

In one embodiment, the GPU 20 is operable to generate images of at least 512×512 pixels at 25 times or more a second for real time imaging. By continuous scanning by the beamformer 14 or continuous input of data, the GPU 20 generates two-dimensional representations from any of various angles of a scanned volume showing changes within the scanned volume seemingly as they occur. Frame rates of 25 frames or more a second are generally associated with real-time scanning. By using the hardware acceleration of the GPU 20, more rapid volume rendering is provided for real time imaging. In one embodiment, a volume associated with 256×256×128 samples of 8 bit data are provided at 25 volumes per second rendering 512×512 pixels images also at about 25 images a second. Preferably, the two-dimensional representations have minimal artifacts, such as little or barely noticeable Moiré patterns or stair stepping patterns from under-sampling. In alternative embodiments, the GPU 20 processes data for two-dimensional imaging.

For 3D imaging, the gradients are used to determine shading values. For example, if a Phong Specular Reflection model is used, a light intensity value is weighted by an angular relationship of a viewing angle, the surface being shaded and the location of a light source. The weight is the cosine of the angle of a normal to the surface being shaded to the viewing angle and/or angle of the light source. Other lighting models, such as Lambertian model, may also be used. In this case, the contribution from shading only depends on the surface being shaded and the direction of the light source. To determine the normal, the gradient or direction of the surface is calculated. For 2D imaging, the gradients are used for filtering, motion tracking or any other processed. The gradient information is determined by the programmable fragment processor of the GPU 20, but other processors may be used.

Various embodiments are provided for determining gradients and/or shading data for volume rendering. In one embodiment, gradients are computed in the acoustic domain and transformed into gradients for a Cartesian coordinate system. The transformed gradient samples are still located in the acoustic grid. The transformed gradients are used for either filtering or volume rendering. In another embodiment, the gradients are computed from data resampled to ray-lines of the screen domain for volume rendering. In yet another embodiment, the data is shaded using gradient information prior to resampling to ray-lines of the screen domain for volume rendering.

Gradients Computed from the Acoustic Domain

Gradients are computed from data in the acoustic domain. Two-dimensional adaptive filtering processes may be more easily implemented for filtering data in the acoustic domain using the gradients computed in the acoustic domain. Where the filters use gradient information, gradient information calculated from data in the acoustic domain allows easier implementation of the filters. By filtering data in the acoustic domain, variation of the filter parameters as a function of depth and angle may be avoided. To account for the eventual scan conversion, the gradient information calculated from the data in the acoustic domain is transformed to represent gradients in the Cartesian or scan converted grid even though applied to filters filtering in the acoustic domain. The transform converts the value of the gradient, but not necessarily to represent location change of the gradient (i.e., the transform is not be a mere scan conversion).

For three-dimensional imaging systems that avoid scan conversion, scan converted information is not available for calculating gradients. U.S. Pat. No. 6,852,081 (application Ser. No. 10/388,128) discloses a graphics accelerator capable of receiving acoustic data and volume rendering in real time. Since 3D imaging is performed without scan converted ultrasound data, any spatial gradients are calculated in the acoustic domain, such as by the programmable fragment shader of the graphics accelerator or GPU 20. Since the spatial gradient can be calculated from data in the acoustic domain and transformed to a gradient representing a boundary in the Cartesian coordinate or display domain, shading may be provided in real time three-dimensional imaging.

Figure 2:
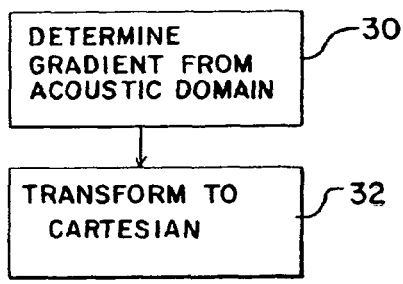
FIG. 2 is a flow chart of one embodiment of a method for computing spatial derivatives.

FIG. 2 shows a flow chart of a method for computing spatial derivatives for medical imaging in one embodiment. By implementing the flow of FIG. 2, a spatial gradient vector representing a gradient in a Cartesian coordinate space is calculated from ultrasound data in the acoustic domain. The ultrasound data is free of scan conversion, such as data in a spherical coordinate format. The spatial gradients in the Cartesian coordinate or display format are represented as $$\frac{\partial I}{\partial x}, \frac{\partial I}{\partial y}, \text{ and } \frac{\partial I}{\partial z},$$

where I (x, y, z) represents ultrasound data in a scan converted format and x, y and z are orthogonal Cartesian coordinate axes. Since the scan converted ultrasound data is unavailable for directly computing the spatial gradients, the spatial gradients are calculated from data in the acoustic domain, represented by A (s, t, r) where s, t and r are curvilinear orthogonal coordinate axes (e.g., s is the angle in the elevation dimension, t is the angle in the azimuth dimension and r is range). If the acoustic grid is not a curvilinear orthogonal system, it can be converted in a curvilinear orthogonal system by padding zeros and/or re-sampling and/or shifting. The spatial derivatives in the acoustic domain are computed as forward or backward difference values, such as represented by:

$$\frac{\partial A}{\partial s}, \frac{\partial A}{\partial t}, \text{ and } \frac{\partial A}{\partial r}.$$

Act 30 of FIG. 2 represents determining the spatial gradient vector in the acoustic domain for at least one ultrasound data sample. A derivative of ultrasound data associated with each data sample is calculated. The derivative is along one of the curvilinear orthogonal coordinate axes, such as the elevation angle, azimuth angle and range. As represented above, a derivative is calculated for each of the axes. In alternative embodiments, derivatives are calculated on only one or two axes. As yet another alternative, the derivatives are calculated for the range and azimuth angle axes for applications in two-dimensional imaging. While a first derivative is used, a second derivative along the same axis may be calculated for one or more of the axes.

In act 32 of FIG. 2, the spatial gradient vector or vectors calculated from data in the acoustic domain is transformed to a Cartesian coordinate system. The spatial gradient vector or vectors in the acoustic domain are weighted as a function of the relationship of the acoustic grid to the Cartesian coordinate system.

Figure 3:
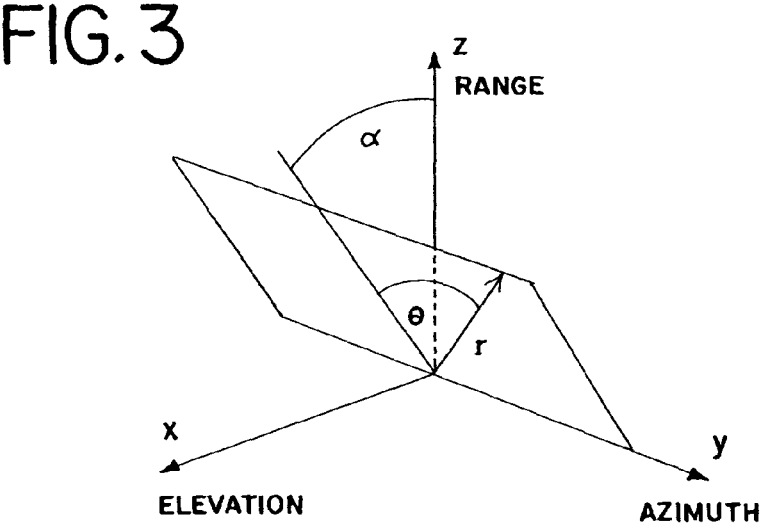
FIG. 3 is a graphical representation showing the spatial relationship between an acoustic domain format and a Cartesian coordinate domain format.

FIG. 3 is a graphical representation showing a relationship between a Cartesian coordinate system with x, y and z axes corresponding to elevation, azimuth and range in relation to a spherical coordinate system having a depth, r, and two angles, α and θ corresponding to elevation and azimuth components of the vector r. The x, y and z coordinates of the Cartesian coordinate system are parametized as represented by:

$x=x(s, t, r),$ $y=y(s, t, r)$ and $z=z(s, t, r).$

Using the spherical coordinate system represented in FIG. 3, the parametization is provided as represented by:

$x=r \cos \theta \sin \alpha$ $y=r \sin \theta$ and $z=r \cos \theta \cos \alpha.$ A matrix multiplication or convolution is used in one embodiment to calculate spatial derivatives in the Cartesian coordinate system as a function of spatial gradient vectors in the acoustic domain. For two-dimensional imaging, at least two spatial derivatives are converted, and for three-dimensional imaging, three spatial derivatives are converted. The matrix represents spatial differences between the acoustic domain format and the Cartesian coordinate system. For example, the spatial gradients in the Cartesian coordinate system, ∇I, are equal to a matrix, M, multiplied with the spatial derivatives in the acoustic domain, ∇A. This matrix multiplication is represented by:

$$\begin{bmatrix} \frac{\partial I}{\partial x} \\ \frac{\partial I}{\partial y} \\ \frac{\partial I}{\partial z} \end{bmatrix} = \begin{bmatrix} \frac{1}{h_s}\frac{\partial x}{\partial s} & \frac{1}{h_t}\frac{\partial x}{\partial t} & \frac{1}{h_r}\frac{\partial x}{\partial r} \\ \frac{1}{h_s}\frac{\partial y}{\partial s} & \frac{1}{h_t}\frac{\partial y}{\partial t} & \frac{1}{h_r}\frac{\partial y}{\partial r} \\ \frac{1}{h_s}\frac{\partial z}{\partial s} & \frac{1}{h_t}\frac{\partial z}{\partial t} & \frac{1}{h_r}\frac{\partial z}{\partial r} \end{bmatrix} \begin{bmatrix} \frac{1}{h_s}\frac{\partial A}{\partial s} \\ \frac{1}{h_t}\frac{\partial A}{\partial t} \\ \frac{1}{h_r}\frac{\partial A}{\partial r} \end{bmatrix} \quad \text{EQ 1,}$$

where, $h_s$, $h_t$ and $h_r$ are scale factors of the curvilinear orthogonal coordinate system, given by:

$$h_s = \left|\frac{\partial P}{\partial s}\right|,$$

$$h_t = \left|\frac{\partial P}{\partial t}\right| \text{ and}$$

$$h_r = \left|\frac{\partial P}{\partial r}\right|,$$

where, $$P = \begin{bmatrix} x \\ y \\ z \end{bmatrix}$$

This can be represented compactly by the following equations:

∇I=M∇A, where:

$$\nabla I = \begin{bmatrix} \frac{\partial I}{\partial x} \\ \frac{\partial I}{\partial y} \\ \frac{\partial I}{\partial z} \end{bmatrix}, \quad \text{EQ. 2}$$

$$M = \begin{bmatrix} \frac{1}{h_s}\frac{\partial x}{\partial s} & \frac{1}{h_t}\frac{\partial x}{\partial t} & \frac{1}{h_r}\frac{\partial x}{\partial r} \\ \frac{1}{h_s}\frac{\partial y}{\partial s} & \frac{1}{h_t}\frac{\partial y}{\partial t} & \frac{1}{h_r}\frac{\partial y}{\partial r} \\ \frac{1}{h_s}\frac{\partial z}{\partial s} & \frac{1}{h_t}\frac{\partial z}{\partial t} & \frac{1}{h_r}\frac{\partial z}{\partial r} \end{bmatrix} \text{ and } \nabla A = \begin{bmatrix} \frac{1}{h_s}\frac{\partial A}{\partial s} \\ \frac{1}{h_t}\frac{\partial A}{\partial t} \\ \frac{1}{h_r}\frac{\partial A}{\partial r} \end{bmatrix}$$

The matrix, M, varies as a function of the acoustic grid geometry. For the geometric relationship shown in FIG. 3, s=α, t=θ and r=r, resulting in:

$h_\alpha = r \cos \theta,$ $h_\theta = r$ and $h_r = 1.$

The matrix, M, and acoustic domain derivative vector ∇A simplify to:

$$M = \begin{bmatrix} \cos\alpha & -\sin\theta\sin\alpha & \cos\theta\sin\alpha \\ 0 & \cos\theta & \sin\theta \\ -\sin\alpha & -\sin\theta\cos\alpha & \cos\theta\cos\alpha \end{bmatrix} \quad \text{EQ 3}$$

$$\nabla A = \begin{bmatrix} \dfrac{1}{r\cos\theta}\dfrac{\partial A}{\partial s} \\ \dfrac{1}{r}\dfrac{\partial A}{\partial t} \\ \dfrac{\partial A}{\partial r} \end{bmatrix}. \quad \text{EQ 4}$$

The matrix M is computed for each pixel or voxel location. In one embodiment, the scale factors $h_s$, $h_t$ and $h_r$ are precomputed and stored in a memory or a lookup table. Alternatively, the scale or factors are computed in real time with the matrix calculations.

In one embodiment, one or both of the calculation of derivatives in the acoustic domain and the transformation of the derivatives to the Cartesian coordinate system are performed with a programmable fragment processor of a graphics processing unit 20. The matrix M is computed for each pixel or voxel location as a fragment process. Using appropriate filters, such as forward-difference, backward-difference, central-difference and their weighted counterparts, the fragment processor computes the vector ∇A from the data in the acoustic domain. Given current fragment processor capabilities, the matrix transformation may be reformulated as shown:

$$\begin{bmatrix} \dfrac{\partial I}{\partial x} \\ \dfrac{\partial I}{\partial y} \\ \dfrac{\partial I}{\partial z} \end{bmatrix} = \begin{bmatrix} \dfrac{1}{h_s^2}\dfrac{\partial x}{\partial s} & \dfrac{1}{h_t^2}\dfrac{\partial x}{\partial t} & \dfrac{1}{h_r^2}\dfrac{\partial x}{\partial r} \\ \dfrac{1}{h_s^2}\dfrac{\partial y}{\partial s} & \dfrac{1}{h_t^2}\dfrac{\partial y}{\partial t} & \dfrac{1}{h_r^2}\dfrac{\partial y}{\partial r} \\ \dfrac{1}{h_s^2}\dfrac{\partial z}{\partial s} & \dfrac{1}{h_t^2}\dfrac{\partial z}{\partial t} & \dfrac{1}{h_r^2}\dfrac{\partial z}{\partial r} \end{bmatrix} \begin{bmatrix} \dfrac{\partial A}{\partial s} \\ \dfrac{\partial A}{\partial t} \\ \dfrac{\partial A}{\partial r} \end{bmatrix}, \quad \text{EQ 5}$$

In this case, the matrix, M, reduces to:

$$\hat{M} = \begin{bmatrix} \dfrac{\cos\alpha}{r\cos\theta} & -\dfrac{1}{r}\sin\theta\sin\alpha & \cos\theta\sin\alpha \\ 0 & \dfrac{1}{r}\cos\theta & \sin\theta \\ -\dfrac{\sin\alpha}{r\cos\theta} & -\dfrac{1}{r}\sin\theta\cos\alpha & \cos\theta\cos\alpha \end{bmatrix}, \quad \text{EQ 6}$$

and the acoustic domain vector reduces to the derivatives along the acoustic domain axes as represented by:

$$V = \begin{bmatrix} \dfrac{\partial A}{\partial s} \\ \dfrac{\partial A}{\partial t} \\ \dfrac{\partial A}{\partial r} \end{bmatrix}. \quad \text{EQ 7}$$

Since the matrix M relies entirely on spatial relationships between the acoustic grid and the Cartesian coordinate grid, the matrix is precomputed and stored in a memory, such as the video RAM 22, for rapid computation of the gradients and transformation.

In alternative embodiments, processors other than the fragment processor are used for implementing the transform and/or calculation of gradients in the acoustic domain. The equations discussed above represent calculation of gradients and transformation of the gradients for three-dimensional volumes. In other embodiments, the gradients are calculated and transformed for two dimensions. For example, the four matrix values in the upper left side of matrix, M, are used for determining the spatial derivatives in the x and y domains from the acoustic domain spatial derivatives in the azimuth and range.

One example of a curvilinear orthogonal coordinate transform is provided above. Equation 1 provides a generalization to various orthogonal coordinate systems. Scan formats such as vector, sector, curve, curve-vector and their 3D counterparts may all be accommodated by determining the spatial relationship between the acoustic grid and the Cartesian coordinate grid.

In one embodiment, a two-dimensional image is generated from the ultrasound data in the acoustic domain. The two-dimensional image is generated as a function of the transformed spatial gradient vector. For example, the data in the acoustic domain is adaptively filtered for enhancing image contrast while reducing speckle variance. The two-dimensional adaptive filtering adapts as a function of the spatial derivatives or gradient vectors. Filtering responsive to gradient information may provide speckle reduction, feature enhancement and edge enhancement. Gradients identify edges or features so that the filtering kernel is selected as a function of the likelihood of an edge or feature within the filter region. Spatial gradients are used to determine when to apply smoothing for speckle reduction, such as applying smoothing where an edge or feature is not located (e.g., low gradient value) and when to apply edge enhancement or less smoothing. Since speckle is associated with high frequency variation, identification of gradients associated with low frequency variation allows removal of the speckle information while maintaining or enhancing feature and edge information. Since acoustic domain data is filtered, the adaptive filter is less likely to vary as a function of angle and depth. After the data is filtered in the acoustic domain, the ultrasound data is scan converted to form the image.

If gradients calculated from data in the acoustic domain were applied by the adaptive filtering without transformation, an error would be introduced once the filtered data is scan converted. The transformation of the spatial gradients prior to application of the filter avoids introduction of the spatial artifact. While the filtering or other processing discussed above are applied for two-dimensional imaging, the filtering or other processing may also be performed for three-dimensional imaging.

In an embodiment for three-dimensional imaging, the ultrasound data is volume rendered as a function of the transform spatial gradient vector. The transformed spatial gradient vector is used for volume rendering with shading. The gradient vector or normal vector to a surface identified by the three-dimensional gradients provides an angle of the surface. Shading is performed by determining a relationship between the direction of a light source and the surface or normal vector. For example, shading for a given location is calculated as amplitude or light intensity times the cosine of the angle of the light source to the normal vector in a Lambertain Model. Alternatively, a Phong Specular Reflection model for shading is used. A gradient for each ray line location or 3D volume location is computed for shading in a Phong Specular Reflection model. The angle of the viewer to the normal is accounted for in addition to the angle of the light source to the normal.

In one embodiment, a shading value is calculated and added to the ultrasound data value, voxel or intensity. In other alternative embodiments, the shading value weights the ultrasound data as a multiplication, division, subtraction, addition, combinations thereof, linear, nonlinear, texture map or other functions. The shading alteration is calculated for each of a plurality of locations within the volume. In one embodiment, the shading is performed after resampling along ray lines as discussed in the background section above. The gradient values are calculated prior to the resampling and are interpolated or resampled to the ray lines. In alternative embodiments, the shading is performed before resampling or at other times within the volume rendering process using gradients calculated from data in the acoustic domain and transformed to gradients representing the Cartesian coordinate or other coordinate system.

In one embodiment, a three-dimensional representation is generated from ultrasound data in the acoustic domain (pre-scan converted data) without scan conversion of the ultrasound data, such as disclosed in U.S. Pat. No. 6,852,081 (application Ser. No. 10/388,128). The three-dimensional representation is generated without scan conversion of the ultrasound data representing regions, areas or planes. In alternative embodiments, ultrasound data scan converted to represent one or more planes is used by interpolating the data to a three-dimensional grid. The three-dimensional representation is then volume rendered from the three-dimensional grid. For example, the GPU 20 includes a programmable vertex processor(s) for processing vertices, a primitive assembly for assembling the vertices, a rasterization and interpretation stage for forming fragments, a programmable fragment processor for texture mapping, shading, filling or otherwise interpolating information for the fragments and a frame buffer for outputting a two-dimensional image representing three-dimensional volume. In alternative embodiments, the GPU 20 performs volume rendering using blending and ray casting, but surface modeling or other three-dimensional rendering processes may be used.

Gradients Computed in the Display Coordinate Domain After Sampling to Ray Lines:

To avoid interpolation of multiple gradient values as well as voxel intensity values for volume rendering, spatial derivatives are computed in the screen domain. Resampling data from the acoustic domain or a 3D Cartesian coordinate grid to ray lines representing the viewing angle through the volume is performed before calculation of gradients. The voxel intensity data are interpolated along rays cast through the acquired volume. Each ray represents a pixel location in the display coordinates. Gradients are calculated for each value along each ray in the screen domain. The screen domain provides a plurality of points in a Cartesian coordinate format spaced as pixels.

Figure 4:
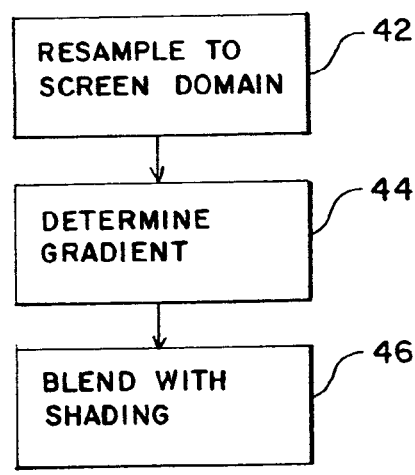
FIG. 4 is a flow chart diagram of one embodiment for determining gradients in the screen domain.
Figure 5:
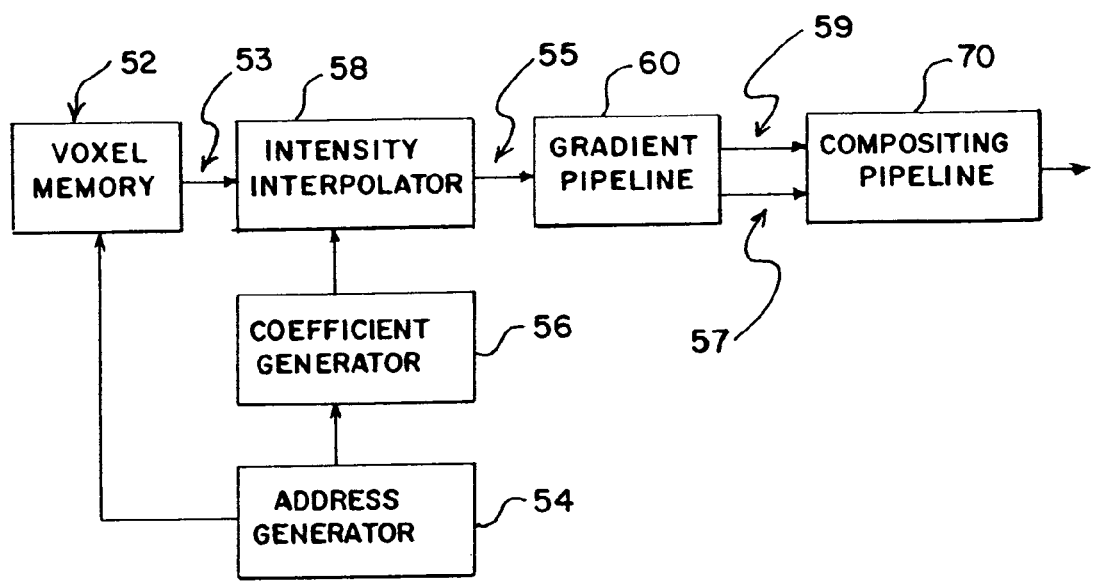
FIG. 5 is a block diagram of a system for determining gradients in the screen domain.

FIG. 4 shows one embodiment of a method for computing spatial derivatives for medical ultrasound imaging. FIG. 5 shows a system for implementing the embodiment of FIG. 4. Different systems than shown in FIG. 5 may be used to implement the embodiment of FIG. 4. Likewise, different methods may be implemented using the system of FIG. 5.

As shown in FIG. 5, a voxel memory 52, such as a RAM or other now known or later developed memory, stores voxel information or intensities representing various spatial locations within the volume. An address generator 54, such as an application specific integrated circuit or processor for accessing the memory 52, also connects with a coefficient generator 56. The coefficient generator 56 is a lookup table memory, processor or other now known or later developed device for weighting data as a function of the 3D grid in comparison to ray lines along viewing directions for interpolation. The coefficient generator 56 generates coefficients or weights for the interpolation. An intensity interpolator 58 is a processor, application specific integrated circuit, or other now known or later developed device for generating a value along each of a plurality of ray lines as a function of ultrasound data accessed from the voxel memory 52 and associated coefficients generated by the coefficient generator 56. The voxel memory 52, address generator 54, coefficient generator 56 and intensity interpolator 58 are components of a graphics processing unit 20 and associated memory 22 in one embodiment, but may be separate devices.

The voxel memory 52 outputs ultrasound data along data path 53. The ultrasound data is formatted in the acoustic format (e.g., spherical coordinate), Cartesian coordinate or other 3D grid format. The ultrasound data is segmented in one embodiment, but may be unsegmented in other embodiments. Based on the addresses generated by the address generator 54, the voxel memory 52 outputs 1, 2, 3, 4, 8, 32 or other number of voxels nearest to a ray line position for interpolation of a value at the ray line position after weighting by coefficients from the coefficient generator 56.

In act 42 of FIG. 4, ultrasound data in the acoustic or a 3D Cartesian coordinate domain are resampled to the screen domain. For example, ultrasound data in an acoustic domain is resampled to ray lines representing a viewing angle through a three-dimensional volume. A plurality of parallel cut planes (or alternatively, concentric spherical surfaces) are formed perpendicular to the viewing direction. Each of the cut planes intersects the volume in parallel. A plurality of ray lines, such as a ray line representing each pixel or display coordinate on the display, intersect the cut planes. The ultrasound data is resampled to the points of intersection of the ray lines with each of the cut planes. As a result, sets of data representing different depths through the volume from a viewing direction along each ray line are provided. Where the viewing angle through the same data changes, different cut planes and ray lines are used, resulting in another interpolation. Where the ultrasound data and the volume changes, the new data is also interpolated to ray lines corresponding to the viewing direction along a plurality of cut planes. Any number of ray lines or cut planes may be used.

Referring to FIG. 5, the intensity interpolator 58 outputs interpolated ultrasound data along a data path 55. The interpolated ultrasound data is in the display screen domain, such as data representing one or more pixels in a Cartesian coordinate display screen at different depths. Since the ray lines correspond to pixel locations or axes oriented relative to the display, the ultrasound data is in the display screen domain.

The interpolated ultrasound data is provided to the gradient pipeline 60. In one embodiment, the gradient pipeline 60 is a processor, application specific integrated circuit, buffers, accumulators, summers, multipliers or any other now known or later developed device for calculating gradients. The gradient pipeline 60 calculates the gradients along at least one dimension. For two-dimensional imaging, the gradient pipeline 60 calculates the gradients along one or two dimensions. For three-dimensional imaging, the gradient pipeline 60 calculates the gradients along one, two, or three dimensions. By calculating the gradients from ultrasound data in the display screen domain, interpolation of gradient values from a different format is avoided or minimized.

FIG. 6 is a block diagram representing the gradient pipeline 60 in one embodiment. The gradient pipeline 60 computes a 3×3×3 finite impulse response for each of three directions or dimensions. The output of each 3×3×3 finite impulse response filter is a gradient in the display space calculated from the resampled segmented or non-segmented ultrasound data. A plurality of delays or buffers 62 are provided and connected as shown. Each of the buffers 62 is labeled with delay length. The delays shown in FIG. 6 correspond to a three-dimensional Sobel gradient operator. Other delays using the same or different gradient calculations may be used. As shown in FIG. 6, each buffer 62 labeled with an X indicates a delay equal to 1 display space in the X direction, Y–2X represents a delay of 1 display space in the Y direction minus a delay of 2 spaces in the X direction, and Z–2Y–2X represents a delay of 1 display space in the Z direction minus a delay of 2 spaces in both the X and Y directions. Since acoustic data in the display screen domain is used, the Z represents an axis that is parallel with the viewing lines or rays cast in both the X and Y directions.

A subtractor 64 is provided for subtracting outputs of the pipeline delays selected as shown in FIG. 6 into three different values for each of the Z, Y and X dimensions. The three values are then multiplied by multipliers 66 with the weights shown (e.g., 2, 3 and 6). The three weighted values are then summed to provide a gradient in each of the Z, Y and X dimensions by the summers 68. Other weightings, circuit structures or devices may be used for calculating the gradients.

By using ray lines cast in parallel, the number of delays or buffers 62 is minimized in exchange for an increase in the number of redundant rays cast. The greater the amount of available storage, the more efficient the device and associated processing becomes. For example, if a group of 20×20 rays are calculated in parallel, 142 pipeline delays are used for 81 percent efficiency (400 rays cast and 324 results provided). The following equations represent this efficiency:

Pipeline Delays=$2*Px*Py+2*Py+2$    EQ 8

Efficiency=$[((Px-2)*(Py-2))/(Px*Py)]*100\%$    EQ 9 where

Px=number of parallel rays in the x direction

Py=number of parallel rays in the y direction

The gradient pipeline 60 outputs the gradient information along the three axes of the display domain as well as outputs the interpolated ultrasound data. The interpolated ultrasound data is delayed as a function of some of the buffers 62 to correspond in timing with the gradient data output. The remaining arrow to the right is the output of the interpolated data. FIG. 5 shows the data path 57 for outputting gradient information and a data path 59 for outputting the delay interpolated ultrasound data.

As shown in FIG. 4, act 44 shows determining the gradient information from the resampled ultrasound data. The gradients are determined from the ultrasound data in the screen domain in a plurality of cut planes. Each cut plane is a two-dimensional representation of a plane within the three-dimensional volume. Using the delays or buffers as shown in FIG. 6, the resampled ultrasound data from adjacent ray lines are delayed relative to each other so that the gradient information is determined from the delayed resampled ultrasound data. By providing the delays, the ultrasound data representing spatial locations in any given cut plane in the screen domain adjacent to a current spatial location are identified and used for determining a gradient. A sufficient number of buffers or delays 62 are provided to store the values of the ultrasound data for determining the gradient in one or more dimensions for each location. In alternative embodiments, the resampled or interpolated ultrasound data is stored in a memory and addressed as needed for calculating the gradients with a processor or other device.

Referring to FIG. 5, the compositing pipeline 70 determines values along each ray line as a function of the resampled ultrasound data and the gradient information input to the compositing pipeline 70. The compositing pipeline 70 is a processor, application specific integrated circuit, memory, buffers, summers, multipliers, subtractors or other now known or later developed devices for compositing values along ray lines for volume rendering.

As represented by act 46 in FIG. 4, the compositing pipeline 70 composites or blends the ultrasound data with shading. Values along the ray lines are determined as a function of the resampled ultrasound data and the gradient information. For example, a single value is determined for each ray line to represent a pixel on the display. A maximum value or minimum value is selected from along each ray line. In other embodiments, the blending includes a weighted summation of a plurality of values along the ray line, such as all values. The weights correspond to desired transparency, opacity, and/or normalization of the blending operation. For a normalized blending, each of the values along a ray line are equally weighted and summed. Various thresholds may be applied to select data only above, below or within a value range along each ray line.

In addition to blending along each of the ray lines, the resampled ultrasound data is shaded as a function of the gradient information. For example, each of the ultrasound values at each ray line location on the plurality of cut planes are shaded prior to blending. The gradient information for each of three dimensions associated with each ultrasound value is used to determine a normal vector for that location. An angle of the light source to the normal vector is calculated. The angle of the viewing direction to the normal may also be included in the shading calculation. The cosine of one or both angles is multiplied by the light intensity. The cosines may also be raised to higher powers prior to multiplication. The resulting value is added to the ultrasound data, but may be multiplied, divided, subtracted or combined with the ultrasound value in any of various now known or later developed functions. The result is an ultrasound value shaded as a function of the gradient values.

After the shaded ultrasound values are composited or blended, the compositing pipeline 70 outputs intensities, colors or other values representing the ultrasound data at each pixel from the display. The resulting two-dimensional image represents the three-dimensional volume as viewed from the viewing direction. As a result of using the process shown in FIG. 4 or the system shown in FIG. 5, about ¼ of the number the accesses to memories is required than as compared to calculating gradients from a three-dimensional grid and interpolating the gradients during resampling to the ray lines. Interpolation for the gradient components is eliminated and an efficient parallel hardware implementation may be used.

In the pipeline implementation for calculating gradients represented by FIG. 6, a large number of rays are cast in parallel. A 3×3×3 gradient kernel is then used to compute the spatial derivatives for the inner rays. Gradients may not be computed for the outer rows and columns of rays. In one embodiment, the interpolated or resampled intensities for the right most column and bottom most row are saved in a memory or buffer and reused for a next group of rays. This may require more storage units but may be 100 percent efficient if the entire width and height of the display is a lesser dimension than the entire parallel grouping of arrays. In alternative embodiments, the values at the edges are not used in the display or are used in the display without shading. In yet another alternative embodiment, a 2×2 gradient kernel is used for calculating the gradients.

Local storage is used for the gradient calculation as shown in FIG. 6 by the buffer or delay 62. To make the algorithm more efficient, more local storage is used. Less storage means less efficiency but more potential cost savings. Storage can be minimized by calculating a 3×3 group of rays where only the center ray is used. When the center ray of a 3×3 set of rays is the only result from the gradient calculation pipeline, the number of parallel rays computed and stored in the pipeline is the minimum number of 9. Using equation 8 with Px and Py equal to 3, the number of pipeline delays needed is 26. Equation number 9 indicates the efficiency is 11 percent.

Gradients Computed and Shading Provided Prior to Resampling to the Display Domain In an alternative embodiment to determining gradients in the display domain, the gradients are determined and the shading is performed prior to resampling to the display domain or to the ray lines.

FIG. 7 shows a method for computing spatial derivatives for medical ultrasound imaging. Additional, different or fewer acts may be provided. In act 72, gradients are determined for ultrasound data. The ultrasound data is in an acoustic domain format, a Cartesian coordinate format, a reconstructed 3D grid format or other format. The gradients are determined along 1, 2 or 3 dimensions for each ultrasound value. If the ultrasound data are in the acoustic format, the gradient values may be transformed as discussed above in equation 1. Alternatively, gradients are calculated for a subset of the ultrasound values, such as a subset associated with a segmented organ of interest or a selected surface within the volume. The ultrasound data includes opacity or transparency information. For example, the intensities are weighted by opacity or transparency weights. As another alternative, each of the display intensities is associated with an opacity or transparency weight for later combination or use.

In act 74, the ultrasound data is shaded as a function of the gradients. For example, a plurality of display intensities with opacity weights or with transparency weights are shaded as a function of the gradients. The shading is performed as discussed above, such as by determining a normal associated with the gradients for any given selected spatial location. An angle of the light source to the normal is calculated. The angle and a light source intensity are then used to determine a shading value. The angle to the viewing direction and the normal may also be included in the shading calculation. The shading value is then added to the ultrasound intensity. Other functions for combining the ultrasound intensity and the shading value may be used as discussed above. In one embodiment, the ultrasound data is in an acoustic domain and is free of two-dimensional scan conversion. The data in the acoustical domain representing a three-dimensional volume is shaded.

For example, V is a data sample in the 3D acoustic grid. The gradients, G=(Gx, Gy, Gz) are computed for V. The contribution, U, from the light source is given by: U=A cos (Angle(G, L)), where G is the gradient vector, L is a vector showing the light source location, and A is the intensity of the light source. V is replaced with W=V+U. W is a shaded data sample in the acoustic grid. This new acoustic data set is provided to the ray-caster, to the GPU 20 3D Texture process or for volume based rendering.

In act 76, the shaded ultrasound data is resampled or interpolated to ray lines representing a viewing angle through the volume. The resampling is performed for each of a plurality of cut planes at the intersection of a plurality of parallel ray lines along the viewing direction. The ray lines are selected as corresponding to one or more pixels on the display screen, so the ray lines represent a screen domain format. The z dimension is oriented to be parallel with or along the ray lines and the x and y dimensions are perpendicular to the ray lines.

In act 78, the shaded, resampled ultrasound data along each of the ray lines is blended or composited as discussed above. By resampling after the shading step, the ultrasound data includes intensities and opacities or transparencies. The intensities are shaded such that resampling of this data requires less computations and memory accesses than resampling the gradient data and its individual components.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the scope and spirit of this invention.

We claim:

1. A method for computing spatial derivatives for medical imaging, the method comprising:
   (a) determining a spatial gradient vector in an acoustic domain for at least one ultrasound data sample; and
   (b) transforming the spatial gradient vector to a Cartesian coordinate system.

2. The method of claim 1 further comprising:
   (c) volume rendering ultrasound data, including the at least one ultrasound data sample, as a function of the transformed spatial gradient vector from (b).

3. The method of claim 2 wherein (c) comprises volume rendering with shading, the shading being a function of the transformed spatial gradient vector.

4. The method of claim 1 further comprising:
   (c) generating a two dimensional image from ultrasound data, including the at least one ultrasound data sample, as a function of the transformed spatial gradient vector from (b).

5. The method of claim 1 further comprising:
   (c) filtering ultrasound data, including the at least one ultrasound data sample, as a function of the transformed spatial gradient vector from (b), the filtering operable to perform at least one of: speckle reduction, feature enhancement and edge enhancement.

6. The method of claim 1 wherein (a) comprises calculating a derivative of ultrasound data associated with the at least one ultrasound data sample, the derivative along one of: azimuth angle, range and elevation angle.

7. The method of claim 6 wherein (a) comprises calculating a first or higher order derivative as a function of azimuth angle and a second derivative as a function of range.

8. The method of claim 1 wherein (b) comprises weighting the spatial gradient vector of the acoustic domain is a function of a relationship of an acoustic grid to the Cartesian coordinate system.

9. The method of claim 1 wherein (b) comprises calculating two spatial derivatives in the Cartesian coordinate system as a function of multiplying at least two spatial gradient vectors in the acoustic domain by a matrix.

10. The method of claim 9 wherein (b) comprises using a matrix representing spatial differences between the acoustic domain and the Cartesian coordinate system.

11. The method of claim 1 further comprising:
(c) performing (b) with one of a programmable fragment shader, a vertex shader and combinations thereof of a graphics processing unit.

12. The method of claim 1 further comprising:
(c) generating a three-dimensional representation from ultrasound data, including the at least one ultrasound data sample, in the acoustic domain without scan conversion of ultrasound data representing two-dimensional regions.

13. The method of claim 1 further comprising:
(c) performing (b) with a programmable vertex shader of a graphics processing unit.

14. The method of claim 1 further comprising:
(c) performing (b) with programmable vertex and fragment shaders of a graphics processing unit.

15. In a method for computing spatial derivatives for medical ultrasound imaging, the improvement comprising:
(a) calculating a spatial gradient vector representing a gradient in a Cartesian coordinate space from ultrasound data in an acoustic domain, the ultrasound data being free of scan conversion.

16. A system for computing spatial derivatives for medical ultrasound imaging, the system comprising:
a receive beamformer operable to output ultrasound data in an acoustic domain;
a graphic processor unit connected with the receive beamformer, the graphics processor unit operable to determine a spatial gradient vector in the acoustic domain from the ultrasound data and operable to transform the spatial gradient vector to a Cartesian coordinate system.

17. A method for computing spatial derivatives for medical ultrasound imaging, the method comprising:
(a) resampling ultrasound data in an acoustic domain to ray-lines representing a viewing angle through a volume; and
(b) determining gradient information from the resampled ultrasound data.

18. The method of claim 17 further comprising:
(c) determining values along the ray-lines as a function of the resampled ultrasound data and the gradient information; and
(d) blending along the ray-lines with the values of (c).

19. The method of claim 17 further comprising:
(c) delaying resampled ultrasound data from adjacent ray-lines;
wherein (b) comprises determining the gradient information from the delayed resampled ultrasound data.

20. The method of claim 17 wherein (b) comprises determining first and second gradients along first, second and third dimensions.

21. The method of claim 17 further comprising:
(c) shading the resampled ultrasound data as a function of the gradient information.

22. The method of claim 17 wherein (b) comprises determining gradients from ultrasound data in a screen domain, the ultrasound data in the screen domain being a two dimensional representation of a three dimensional volume;
further comprising:
(c) shading the ultrasound data as a function of the gradients.

23. A method for computing spatial derivatives for medical ultrasound imaging, the method comprising:
(a) shading ultrasound data representing locations in a three dimensional volume as a function of a viewing angle; and
(b) resampling the shaded ultrasound data to ray-lines representing the viewing angle through the three dimensional volume.

24. The method of claim 23 further comprising:
(c) blending the shaded, resampled ultrasound data along the ray-lines.

25. The method of claim 23 wherein (a) comprises shading one of: display intensities with opacity weights and display intensities with transparency weights.

26. The method of claim 23 wherein (a) comprises shading ultrasound data in an acoustic domain and free of two-dimensional scan conversion.

27. The method of claim 23 further comprising:
(c) determining gradients for the ultrasound data;
wherein (a) comprises altering the ultrasound data as a function of the gradients.

* * * * *